United States Patent
Amadelli et al.

(10) Patent No.: US 6,824,826 B1
(45) Date of Patent: Nov. 30, 2004

(54) USE OF PHOTOCATALYTIC PREPARATIONS OF COLLOIDAL TITANIUM DIOXIDE FOR PRESERVING THE ORIGINAL APPEARANCE OF CEMENTITIOUS, STONE, OR MARBLE PRODUCTS

(75) Inventors: Rossano Amadelli, Comune Voghiera (IT); Luigi Cassar, S. Donato Milanese (IT); Carmine Pepe, Ponteranica (IT)

(73) Assignee: Italcementi S.p.A., Bergamo (IT)

( * ) Notice: Subject to any disclaimer, the term of this patent is extended or adjusted under 35 U.S.C. 154(b) by 20 days.

(21) Appl. No.: 10/030,241

(22) PCT Filed: Jun. 21, 2000

(86) PCT No.: PCT/EP00/05724

§ 371 (c)(1),
(2), (4) Date: Apr. 11, 2002

(87) PCT Pub. No.: WO01/00541

PCT Pub. Date: Jan. 4, 2001

(30) Foreign Application Priority Data

Jun. 25, 1999 (IT) .......................................... MI99A1422

(51) Int. Cl.$^7$ ............................................... B05D 1/36
(52) U.S. Cl. ..................... 427/258; 427/256; 427/269; 427/279; 427/283; 427/287; 427/294; 427/350; 427/372.2; 106/286.1; 106/286.4; 106/286.5; 106/286.8; 106/287.18; 106/287.19
(58) Field of Search ................................. 428/688, 689, 428/699, 702, 703; 427/256, 258, 269, 279, 283, 287, 294, 350, 372.2; 106/286.1, 286.4, 286.5, 286.8, 287.18, 287.19

(56) References Cited

U.S. PATENT DOCUMENTS

| | | | |
|---|---|---|---|
| 5,049,371 A | | 9/1991 | Rinn et al. ................... 423/592 |
| 5,595,813 A | * | 1/1997 | Ogawa et al. |
| 5,698,205 A | | 12/1997 | Bruckner et al. ........... 424/401 |
| 6,117,229 A | | 9/2000 | Cassar et al. ................ 106/724 |
| 2002/0016250 A1 | * | 2/2002 | Hayakawa et al. |

FOREIGN PATENT DOCUMENTS

| | | | |
|---|---|---|---|
| EP | 0590477 | 4/1994 | ............. E04C/2/02 |
| EP | 0614682 | 9/1994 | ............. A62D/3/00 |
| EP | 633064 | 1/1995 | ............. B01J/35/00 |
| EP | 784034 | 7/1997 | ........... C03C/17/00 |
| EP | 0924164 | 6/1999 | ........... C01B/13/36 |
| FR | 2753980 | 4/1998 | ............ C09D/5/32 |
| JP | 11049588 | 2/1999 | ........... C04B/41/45 |
| WO | WO 9710186 | 3/1997 | ........... C03C/17/00 |
| WO | WO 9805601 | 2/1998 | ........... C04B/22/06 |

OTHER PUBLICATIONS

Brezova et al., "Phenol Decomposition Using $M^{n+}/TiO_2$ Photocatalysts Supported by the Sol–Gel Technique on Glass Fibres", *Journal of Photochemistry & Photobiology A*: Chemistry 109, 177–183 (1997).

* cited by examiner

*Primary Examiner*—Deborah Jones
*Assistant Examiner*—Wendy Boss
(74) *Attorney, Agent, or Firm*—Abelman, Frayne & Schwab

(57) ABSTRACT

Use of photocatalytic preparations of colloidal titanium dioxide optionally doped with a metal chosen from groups I–VA, and the lanthanide and actinide series of the periodic table, for preserving the original appearance of cementitious, stone, and marble products.

16 Claims, No Drawings

USE OF PHOTOCATALYTIC PREPARATIONS OF COLLOIDAL TITANIUM DIOXIDE FOR PRESERVING THE ORIGINAL APPEARANCE OF CEMENTITIOUS, STONE, OR MARBLE PRODUCTS

FIELD OF THE INVENTION

The present invention refers to the use of colloidal photocatalytic preparations of titanium, dioxide ($TiO_2$) for maintaining the original appearance of cementitious, stone, or marble products.

PRIOR ART

The conservation of architectural assets depends to a considerable extent on the environment in which they are located. The problem of the preservation of such assets assumes important dimensions if it is considered that the action of atmospheric agents has become increasingly aggressive over time.

The conservation of architectural structures, buildings and artefacts subject to outdoor exposure has to do with forces that act in an important way on the surface is of the constructions or in the layers immediately below the surface and that regard the depositing of organic and inorganic materials which usually adhere to the aforesaid organic substrate, and the action of acid rain.

One of the main problems of architectural cementitious, stone, or marble products therefore regards the constant maintenance over time of their original appearance, which is undermined by the natural process of ageing due to the influence of atmospheric agents.

The need is therefore particularly felt for economical systems of intervention which enable conservation of the aesthetic characteristics of the surface of constructions made of cementitious, stone, or marble material.

With the aim of protecting such artefacts, various techniques are resorted to, the most common of which consist in applying water-repellent products, such as silicone solutions that are stable in alkaline environments and are stable to light and weather. Unfortunately, the progressive increase in the pollutants present in a typical metropolitan environment, perhaps also on account of their frequently acidic nature, has markedly limited the duration of this type of protection, with consequent aesthetic degradation of the artefact.

In order to overcome this new problem, various solutions have been proposed. For example, the patent IT 1286492 (in the name of the present applicant) illustrates a hydraulic binder for cementitious compositions which comprises in its mass a titanium-dioxide based photocatalyst that is able to oxidize, and hence neutralize, the polluting substances present in the environment. This type of solution is certainly valid as regards the protection of the surface of the artefact from any possible deterioration caused, for example, by wind abrasion, but clearly it implies the use of enormous amounts of photocatalyst as compared to those actually needed. In fact, the photocatalyst is present not only on the surface of the artefact or in the immediately underlying layers, i.e., in the areas where its presence proves useful, but in the entire cementitious mass, which, for the most part, will never come into contact with external agents.

Alternative solutions have also been proposed (see, for example, the European patent, application No. EP 0 885 857 in the name of the present applicant) which regard cementitious levelling plasters containing various polymeric additives and photocatalysts that are able to oxidize the polluting substances present in the environment, but these cementitious-based formulations are white, and cannot be used, for instance, on marble or stone materials without consequently modifying their aesthetic characteristics.

The use of anatase, which is one of the tetragonal crystalline forms of titanium dioxide, as photocatalyst for the oxidation of organic pollutants has been known for some time, also in the form of colloidal preparations.

The patent EP 784034 (in the name of Matsushita Electric Works) describes substrates obtained by depositing titanium dioxide on the surface of a substrate by deposition of a solution containing ammonium titanium fluoride, followed by calcining. The patent EP 614682 (in the name of Fuji Electric) illustrates a titanium-based or titanium/activated carbon-based photocatalyst fixed on a fluororesin to obtain sheets or panels to be applied externally on buildings for removing low concentrations of $NO_x$.

The incorporation of metal ions (doping agents) in these preparations alters the photocatalytic activity of titanium dioxide to a substantial extent. The most important parameters are the type of ion, the concentration of the dopants, and the thermal treatment useful for the formation of the photocatalyst.

Brezová V. et al., J. Photochem. Photobiol. A: Chem., 109, (1997), 177–183, analyze the influence of various metal ions and their concentrations in a particular application of titanium dioxide as photocatalyst, namely, in the oxidation of phenol. In particular, preparations of colloidal titanium dioxide are described, in which the titanium dioxide is doped with various metals at 5% atom/atom, following a procedure whereby colloidal titanium dioxide is first prepared, and next the salt of the doping metal is mixed under heating. Among the various metal ions tested, cerium is reported to reduce the photocatalytic activity of the colloidal titanium dioxide. In the publication, as in other previous publications on this subject, no mention is made of the use of the said photocatalytic products on cementitious materials.

The patent EP 633964 (in the name of Fujisawa, Hashimoto, and Ishihara Sangyo Kaisha) describes a $TiO_2$ based photocatalyst preferably doped with V, Fe, Cu. Co, Ni, Zn, Ru, Rh, Pd. Ag, Pt, or Au, and fixed on a fluorinated polymer for adhesion to the substrate. This photocatalyst is useful for purifying air, but also water, from various undesired substances.

SUMMARY OF THE INVENTION

It has' now been surprisingly found that colourless colloidal preparations of titanium dioxide, or of one of its precursors, possibly doped with elements chosen from groups I–VA, and the lanthanide and actinide series of the periodic table, or mixtures thereof, preferably magnesium, cerium, niobium or lanthanium, wh n applied on the surface of cementitious, stone, or marble products, are able to preserve the original appearance of the surface, without altering the characteristics of the cementitious, stone, or marble material.

The solution devised thus regards a system for treating cementitious, stone, or marble surfaces by using titanium dioxide-based colourless colloidal suspensions, the titanium dioxide being possibly doped with elements chosen from groups I–VA, and the lanthanide and actinide series of the periodic table.

DETAILED DESCRIPTION OF THE INVENTION

The present invention refers to the use of colourless colloidal preparations of titanium dioxide or one of its precursors, for the conservation of the original appearance of cementitious, stone, and marble products, by means of application of said preparations on the given surface.

The colloidal preparations of titanium dioxide or one of its precursors useful for the purposes of the present invention may contain a metal ion chosen from groups I–VA, and the lanthanide or actinide series of the periodic table, and preferably comprising lithium, beryllium, magnesium, scandium, yttrium, lanthanum, cerium, niobium, vanadium, zirconium, and mixtures thereof. More preferably, the colloidal preparations of titanium dioxide or one of its precursors according to the present invention are doped with ions selected from the group consisting of magnesium, cerium, niobium, and lanthanum.

The amount of doping agent, i.e., of metal ion present in the preparations useful for the purposes of the present invention, ranges from 0.1 to 5% (percentage expressed as metal-ion atoms with respect to the atoms of titanium), preferably from 0.1 to 1%.

Preferably, the titanium dioxide present in the preparations according to the invention is prevalently in the form of anatase; i.e., the particles of photocatalyst have an anatase structure at least for 75%.

As precursor of titanium dioxide useful for the purposes of the present invention is meant any product that is able to produce titanium dioxide prevalently in the form of anatase, possibly with appropriate types of thermal treatment. For example, $TiCl_4$, $TiOSO_4$, titanium alkoxide (for instance, titanium isopropoxide) can be effectively used as precursors for the purposes of the present invention.

By polluting substances that are oxidized by the photocatalysts of the present invention are meant the organic substances that may be present in the environment as a result of motor-vehicle exhaust or industrial emissions, such as benzene, aromatic volatile compounds, pesticides, phenols, and benzofluorides, without excluding inorganic compounds, such as nitrogen oxides ($NO_x$) which can be oxidized to yield nitrates.

By cementitious artefact is meant any product in the hardened state deriving from a cementitious composition or cementitious mixture, by cementitious composition or cementitious mixture being meant any composition in which the binder is mixed with water and possibly with aggregates of various grain size. The cementitious compositions thus include both cementitious pastes, i.e., pastes consisting of binder and water (devoid of aggregates), and conglomerates, i.e., mixtures of water, cement and aggregates.

The aggregates or inert substances may be coarse aggregates, such as crushed stones or gravel, or fine aggregates, such as sand, and are classified according to UNI 8520 Standards. Examples of conglomerates are mortars (mixtures of binder, water, and fine aggregate) and concretes (mixtures of water, binder, fine aggregate, and coarse aggregate). Among the cementitious products preferred according to the present invention are cited the so-called "architectural concretes", i.e., in situ castings with non-treated surfaces (plane or shaped) or treated surfaces (for example, sanded).

By marble or stone products are meant the marbles proper, i.e. crystallized metamorphic limestones, "calcetiri", cipollinos, limestone, dolomites, polishable limestone breccias, onyx marbles, serpentines, and ophicalcites; granites proper, i.e., intrusive magmatic rocks consisting of quartz, sodium and potassium feldspars, and micas, other intrusive magmatic rocks (diorites, gabbros, etc.), and the corresponding porphyritic-structured effusive magmatic rocks, metamorphic rocks, such as "gnelsa" and "serizi"; travertine and the so-called commercial stone, such as sandstone, tuff, quartzites, mica schists, slates, basalts, etc. Titanium dioxide in colloidal form is prepared using sol-gel techniques so as to have particles of a size of between 10 and 200 Å, preferably between 50 and 100 Å.

In contrast with what is reported in the prior art, hydrolysis of the titanium dioxide takes: place directly in the presence of the salt of the doping element by co-precipitation or mixing. In fact the preparation of two distinct colloidal suspensions, one containing the titanium dioxide and the other the salt of the doping metal, which are subsequently mixed together, is described in the prior art.

The colloidal suspension is then treated so as to obtain a colloidal film over the material that is to be preserved, a necessary step for assessing the photocatalytic action of titanium dioxide in the presence of the various types of pollutants.

In particular, the colloid in aqueous suspension may be sprayed or applied using a brush directly on the product in small successive amounts until the desired thickness is reached.

UV and visible-light measurements using diffused-reflectance spectroscopy reveal the minimum quantity suitable for guaranteeing maximum light absorption by the $TiO_2$.

As an alternative, the colloidal suspension can be vacuum-dried in order to obtain a titanium-dioxide powder which can be preserved for an unlimited period and re-suspended in water, maintaining its colloidal properties.

When applied on the surface of cementitious, stone, or marble products, the colloidal preparations according to the present invention effectively protect the product from alterations due to organic pollutants, and in general from atmospheric agents, by causing their photo-oxidation.

Generally, when inorganic pollutants do not find an organic substrate to adhere to, they encounter greater difficulties in depositing on the surface of the product As compared to the methods of the prior art, the application of the preparations in question guarantees a form of protection of the above-mentioned products that is long-lasting by using amounts of material, namely titanium dioxide or one of its precursors, that are considerably smaller than those required by the methods described previously.

In particular, the effectiveness of the titanium dioxide according to the present invention, possibly doped with metal ions belonging to groups I–VA, and the lanthanide or actinide series of the periodic table, as compared to the use of other formulations of titanium dioxide, considerably accelerates photo-oxidation of polluting agents, as illustrated in the assays described later (Examples 9, 10 and 11).

Particularly surprising is the fact that the colloidal titanium dioxide prepared according to the present invention reveals excellent adhesion to the cementitious, marble or stone material to be protected.

This was verified by subjecting specimens of cementitious and marble material treated with the titanium-dioxide colloidal suspension to leaching in water under stirring (Examples 7 and 8).

It is to be noted that the colloid according to the present invention finds in cementitious, marble or stone materials an optimal substrate for the photocatalytic action envisaged, whilst for other materials, such as glass, adhesion of the colloid is possible only via a type or thermal treatment which is particularly burdensome, at approximately 5 000° C., in the presence of an organic crosslinking agent.

The activity of the colloidal preparation has moreover proved effective after various cycles of fouling with coloured organic substrates and subsequent cleaning of the specimens treated, thus demonstrating the effect of the photocatalyst over time. Examples of implementation of the present invention will now be described. In these examples, the percentage of dopant is to be understood calculated as metal-ion atoms with respect to the titanium atoms.

EXAMPLE 1

Preparation of Colloidal Titanium Dioxide

The preparation in question is based on the controlled hydrolysis of the titanium-dioxide precursor. The typical preparation involves the addition of titanium isopropoxide to a solution 0.1 M of $HNO_3$ to obtain 0.565 mol. of titanium dioxide per liter.

In particular, in a 1-liter beaker containing water (750 ml) and $HNO_3$ at a 65% concentration (5.2 ml), titanium isopropoxide (125 ml) was added slowly under vigorous stirring. The resulting solution was heated up to 80° C. for 8–12 hours, maintaining vigorous stirring. In this way, the isopropanol that had formed was evaporated. The volume of the reaction mixture was kept at 200 ml by adding water.

EXAMPLE 2

Preparation of Colloidal Titanium Dioxide Doped With Cerium

Using cerium (Ill) nitrate hexahydrate (0.0277 g) to be dissolved in the hydrolysis water (150 ml), and titanium isopropoxide (25 ml), and following the procedure described in Example 1, the product in question, containing 0.1% $Ce^{3+}$, was obtained.

EXAMPLE 3

Preparation of Colloidal Titanium Dioxide Doped With Niobium

Using niobium (V) pentachloride (0.0223 g) to be dissolved in acetone (10 ml), and titanium isopropoxide (25 ml), and following the procedure described in Example 1, the product in question, containing 0.1% $Nb^{5+}$, was obtained.

EXAMPLE 4

Preparation of Colloidal Titanium Dioxide Doped With Magnesium

Using magnesium (II) chloride hexahydrate (0.0213 g) to be dissolved in the hydrolysis water (150 ml), and titanium isopropoxide (25 ml), and following the procedure described in Example 1, the product in question, containing 0.1% $Mg^{2+}$, was obtained.

EXAMPLE 5

Preparation of Colloidal Titanium Dioxide Doped With Lanthanium

Using lanthanium (III) nitrate hexahydrate (0.037 g) to be dissolved in the hydrolysis water (150 ml), and titanium isopropoxide (25 ml), and following the procedure described in Example 1, the product in question, containing 0.1% $La^{3+}$, was obtained.

EXAMPLE 6

Preparation of Colloidal Films on Glass Substrates

The colloid (10 ml) prepared as described in Examples 1–5 was put in a hermetically sealed glass container so as to hinder complete evaporation of the water and at the same time favour the regular growth of the particles from an average size of 50 Å to a maximum size of 100/200 Å, and was then heated up to 200–220° C. overnight. The precipitated colloid was re-suspended by mechanical stirring and vacuum heat-concentrated until a concentration of 150 g/l was obtained. Next, Carbowax 2000 (300 mg) was added, and the dispersion underwent stirring for 8 hours until total dissolution of the Carbowax was achieved and a homogeneous suspension was obtained.

The resulting product was spread on glass substrates and set to dry in a muffle oven at 500° C. for 30 minutes. The film was characterized by means of diffused-reflectance spectroscopy.

Without the use of the Carbowax crosslinking agent it is impossible to get the colloid to adhere to a glass substrate.

EXAMPLE 7

Preparation of Colloidal Films on Cementitious-Mortar Substrates

The colloid (10 ml) prepared as described in Examples 1–5 was put in a hermetically sealed glass container so as to hinder complete evaporation of the water and at the same time favour the regular growth of the particles from an average size of 50 Å to a maximum size of 100/200 Å, and was then heated up to 200–220° C. overnight.

Specimens of cementitious mortar (disks sized 25×8×2.5 cm) were prepared using white cement Italbianco Italcementi 52.5 R.

After the preparation, the specimens were cured for 1 day in moulds in an environment at 20° C. and relative humidity (RH)>90%. After ejection, the specimens were kept for a further 7 days at 20° C. and RH≈160%.

The aqueous suspension was brush-applied on the said specimens of cementitious mortar.

The colloid was brush-applied in small successive amounts until the typical spectrum observed in diffused-reflectance spectroscopy was obtained. Leaching tests ware carried out in water for 48 hours, under stirring, and these tests confirmed the adhesion of the colloid. Each test specimen was then observed in diffracted-reflectance spectroscopy. In all, the equivalent in weight of approximately 1 g/m² was applied on each test specimen.

EXAMPLE 8

Preparation of Colloidal Films on Marble Substrates

The colloid (10 ml) prepared as described in Examples 1–5 was put in a hermetically sealed glass container so as to hinder complete evaporation of the water and at the same time favour the regular growth of the particles from an average size of 50 Å to a maximum size of 100/200 Å, and was then heated up to 200–220° C. overnight.

The colloidal suspension was vacuum-dried so as to obtain a titanium-dioxide powder, which was re-suspended in water (45 g/l) and brush-applied on a specimen of white Carrara marble (dimensions, 3×3×3 cm). Leaching tests were carried out in water for 48 hours, under stirring, and these tests confirmed the adhesion of the colloid. Each test specimen was then observed in diffracted-reflectance spectroscopy. An amount of titanium dioxide corresponding in weight to approximately 1 g/m$^2$ was evaluated.

EXAMPLE 9

Degradation of 4-Chlorophenol 4-chlorophenol 10 mM (3 ml) was put in an irradiation cell, in which each time were suspended the specimens prepared according to Example 7 with the colloids prepared according to Examples 14 and containing the catalysts according to the invention, and, as a standard specimen for comparison, a specimen prepared in a similar way using Degussa titanium dioxide, which, to the knowledge of the present applicant, is the most active photo-oxidation catalyst present on the market. The cell was closed under oxygen, and the degradation of the 4-chlorophenol was monitored by spectrophotometry, measuring the degradation times (in hours). The results are given in FIG. 1 below.

FIG. 1
Coll. TiO$_2$+Mg
Coll. TiO$_2$+Nb
Coll. TiO$_2$+Ce
Coil. TiO$_2$
Degussa TiO$_2$ Degradation time (hours)

As may be seen in FIG. 1, the specimens containing the dopant ions yield a time of degradation of the pollutant lower both with respect to the test specimen containing colloidal titanium dioxide and with respect to the standard specimen containing Degussa titanium dioxide.

EXAMPLE 10

Degradation of Naphthionic Acid

Following basically the procedure described in Example 9, but performing the decomposition of naphthionic add 0.026 mM (3 ml) in water, an evaluation was made of the behaviour of the specimen prepared according to Example 7, using the titanium-dioxide colloid doped with lanthanium according to classic methods and prepared as described in Example 5. For comparison, two non-colloidal standard specimens of Degussa titanium dioxide were evaluated, one as such, and the other doped with lanthanium according to classic methods. The results are given in FIG. 2 below.

FIG. 2
Coll. TiO$_2$+La
Coll. TiO$_2$
Degussa TiO$_2$+La 1%
Degussa TiO$_2$

Degradation time (minutes)

As may be seen in FIG. 2, the degradation time for the colloidal titanium dioxide is lower than for the Degussa titanium dioxide, both in the case of the specimen containing the dopant ion and in the case of the specimen not containing the dopant ion.

EXAMPLE 11

Degradation of 3-4-Dihydroxycinnamic Acid

Following basically the procedure described in Example 9, and using 34 dihydroxycinnamic acid 0.26 mM (3 ml) in water, the following were evaluated:
a) behaviour of the specimen prepared according to Example 7, using the titanium-dioxide colloid doped with niobium prepared as described in Example 3;
b) behaviour of the specimen prepared according to Example 7, using the titanium-dioxide colloid doped with magnesium prepared as described in Example 4; and
c) behaviour of the specimen of colloidal titanium dioxide prepared according to Example 8 on a marble test specimen.

For comparison, a standard specimen of Degussa non-colloidal titanium dioxide was evaluated. The results are illustrated in FIG. 3.

FIG. 3
Coll. TiO$_2$+Mg
Coll. TiO$_2$+Nb
Coll. TiO$_2$ on marble
Coll. TiO$_2$ on mortar
Degussa TiO$_2$ Decolorizing time (minutes)

As may be seen in FIG. 3, the decolorizing times (oxidation of the pollutant) of the photocatalysts according to the present invention are in all cases shorter than for the Degussa titanium dioxide in the non-colloidal form.

EXAMPLE 12

Degradation of Alcoholic Extract of Tobacco

Following basically the procedure described in Example 9, and using alcoholic extract of tobacco on cement matrices, the following were evaluated:
a) behaviour of the specimen prepared according to Example 7, using the titanium-dioxide colloid described in Example 1;
b) behaviour of the specimen prepared according to Example 7, using the titanium-dioxide colloid doped with cerium prepared as described in Example 2; and
c) behaviour of the specimen prepared according to Example 7, using the titanium-dioxide colloid doped with magnesium as described in Example 4.

The alcoholic extract of tobacco was added in an amount such as to produce a drop in transmittance from 75 to 40, read at 450 nm.

For comparison, Degussa titanium dioxide standard specimens, one at 10% and one at 0.1%, were evaluated. The results are illustrated in FIG. 4.

FIG. 4
Coll. TiO$_2$+Mg
Coll. TiO$_2$+Ce
Coll. TiO$_2$+Nb
Coll. TiO$_2$
Degussa TiO$_2$, 10%
Degussa TiO$_2$, 0.1%

Degradation time (hours)

As may be seen in FIG. 4, the times of degradation of the pollutant for the photocatalysts according to the present invention are in all cases shorter than for the Degussa titanium dioxide in the non-colloidal form.

What is claimed is:

1. A method for preserving the original appearance of cementitious, stone, or marble product from the action of atmospheric agents, characterized in that the surfaces of said products are treated with small successive amounts of an aqueous suspension of a colorless colloidal preparations of titanium dioxide or one of its precursors, until the desired thickness is reached.

2. A method according to claim 1, wherein the preparations of titanium dioxide or one of its precursors contain a metal ion chosen from the groups I–VA, and the lanthanide or actinide series of the periodic table, and mixtures thereof.

3. A method according to claim 2, wherein the preparations of titanium dioxide or one of its precursors contain a metal ion selected from the group consisting of lithium, beryllium, magnesium, lanthanium, cerium, and mixtures thereof.

4. A method according to claim 3, wherein the preparations of titanium dioxide or one of its precursors contain ions selected from the group consisting of magnesium, cerium, and lanthanium.

5. A method according to claim 2, wherein the preparations of titanium dioxide or one of its precursors contain the metal ion in an amount of from 0.1 to 5% (percentage expressed as metal-ion atoms with respect to the titanium atoms).

6. A method according to claim 5, wherein the preparations of titanium dioxide or one of its precursors contain the metal ion in an amount of from 0.1 to 1%.

7. A method according to claim 1, wherein the titanium dioxide is prevalently in the form of anatase.

8. A method according to claim 7, wherein at least 75% of titanium dioxide is in the form of anatase.

9. A method according to claim 1, wherein the titanium-dioxide precursor is a product able to produce titanium dioxide prevalently in the form of anatase.

10. A method according to claim 9, wherein the titanium-dioxide precursor is a product able to produce titanium dioxide prevalently in the form of anatase with appropriate types of thermal treatment.

11. A method according to claim 9, wherein the titanium-dioxide precursor is chosen from the group comprising $TiCl_4$, $TiOSO_4$, and titanium alkoxide.

12. A method according to claim 1, for the oxidation of polluting substances chosen from the group comprising organic substances present in the environment as a result of motor-vehicle exhaust or industrial emissions, and inorganic compounds.

13. A method according to claim 12, for the oxidation of nitrogen oxides ($NO_x$).

14. A method according to claim 1, wherein the titanium dioxide in colloidal form is prepared using sol-gel techniques so as to obtain particles having a size of between 10 and 200 Å.

15. A method according to claim 14, wherein the particles of titanium dioxide have a size of between 50 and 100 Å.

16. A method according to claim 1, wherein the colloidal preparation is vacuum-dried so as to obtain a powder which can be re-suspended in water, maintaining its colloidal properties.

* * * * *